United States Patent [19]

Allen et al.

[11] Patent Number: 5,061,170
[45] Date of Patent: Oct. 29, 1991

[54] APPARATUS FOR DELIVERING MOLTEN POLYMER TO AN EXTRUSION

[75] Inventors: Martin A. Allen, Gainesville; John T. Fetcko, Dawsonville, both of Ga.

[73] Assignee: Exxon Chemical Patents Inc., Linden, N.J.

[21] Appl. No.: 447,930

[22] Filed: Dec. 8, 1989

[51] Int. Cl.⁵ .............................................. B29C 47/08
[52] U.S. Cl. .................................. 425/197; 425/205; 425/208; 425/382.3
[58] Field of Search .................... 264/176.1, 211.23; 425/205, 207, 382.3, 145, 197

[56] References Cited

U.S. PATENT DOCUMENTS

| 170,761 | 12/1875 | Morand | 425/205 |
| 1,156,096 | 10/1915 | Price | 264/211.23 |
| 2,253,176 | 8/1941 | Graves | 264/176.1 |
| 2,278,875 | 4/1942 | Graves | 264/176.1 |
| 2,295,942 | 9/1942 | Fields | 264/176.1 |
| 4,329,128 | 5/1982 | Forgues | 425/379.1 |
| 4,336,213 | 6/1982 | Fox | 425/382.3 |
| 4,642,040 | 2/1987 | Fox | 264/176.1 |

Primary Examiner—Jay H. Woo
Assistant Examiner—William J. Matney, Jr.
Attorney, Agent, or Firm—R. L. Graham

[57] ABSTRACT

A polymer metl delivery system includes a preheated hopper, a high clearance auger, a gear pump, and provisions for delivering heat to the polymer. The resin is melted and fed to the auger and pumped to the gear pump and further pump to an extrusion die. Heat is added to the polymers from the hopper and throughout its course to the outlet connection for the extrusion die. The preheated in the hopper includes heat conductive fins. The system is particularly suited for use in combination with a meltblowing die.

12 Claims, 4 Drawing Sheets

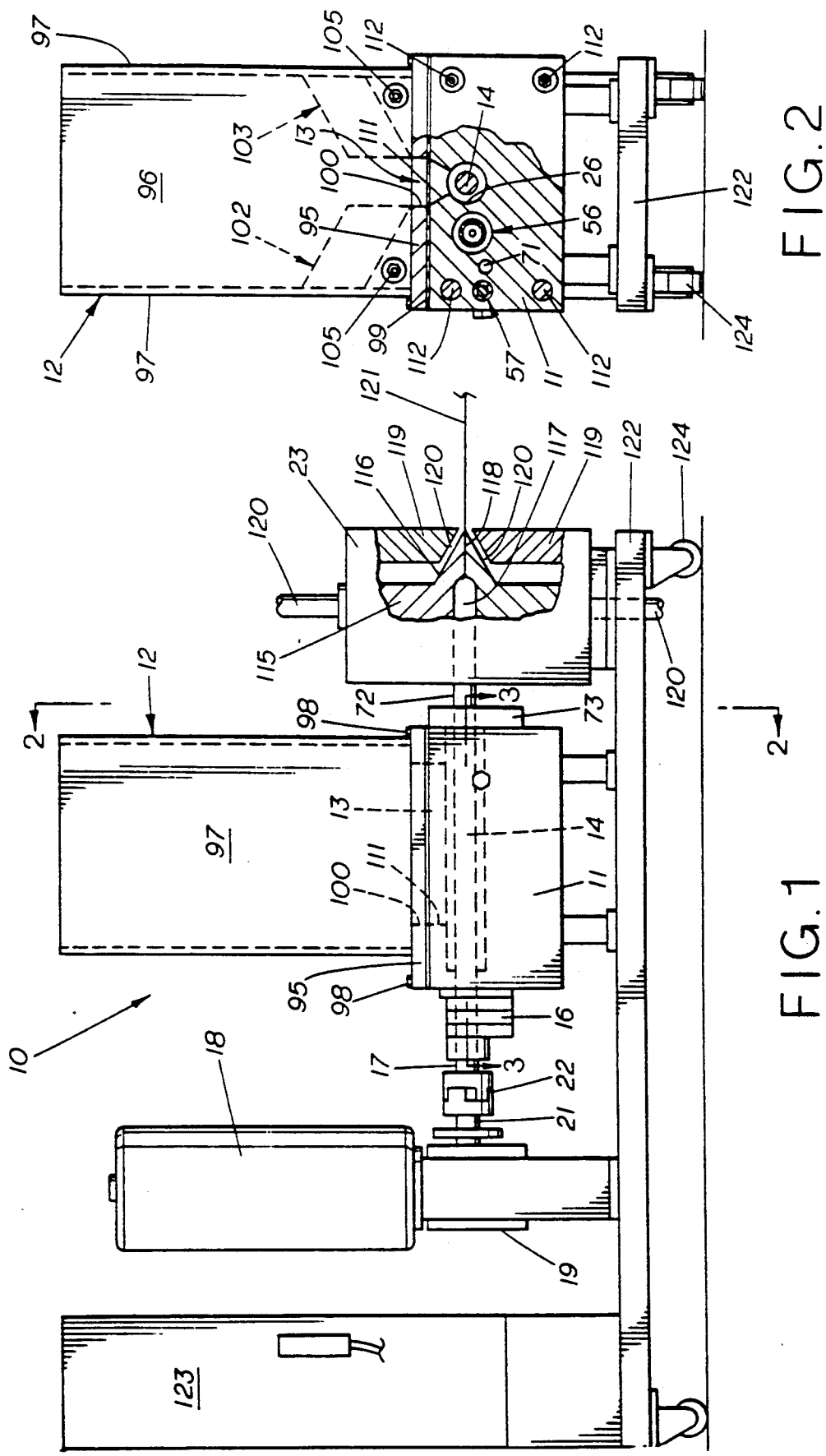

APPARATUS FOR DELIVERING MOLTEN POLYMER TO AN EXTRUSION

BACKGROUND OF THE INVENTION

This invention relates generally to the conversion of polymer resin to molten form for use in a downstream applicator such as a meltblowing die, a spunbond die, an adhesive applicator die, a mold die, and the like. In one aspect the invention relates to a system for delivering pressurized polymer melt to an extrusion die using a fully integrated system. In a specific aspect, the invention relates to a polymer melt delivery system for use in meltblowing.

In many applications involving the use of molten polymer, the polymer resin must not only be melted but must also be delivered to a die under pressure at a controlled rate and temperature. For example, in the production of meltblown products, resin is processed through an extruder, which melts the polymer and delivers it to a die at typical temperatures of between about 400° F. and 800° F. and pressures up to 700 psi. The meltblowing die comprises a row of side-by-side orifices flanked by air passages. The molten resin is extruded through the orifices forming fibers, which are stretched and attenuated by sheets of hot air discharging from the air passages. The microsized fibers are collected on a drum or conveyor in the form of entangled fibers forming a nonwoven web or may be deposited on a substrate. In some meltblowing systems, a gear pump is positioned between the extruder and the die to deliver a metered amount of molten polymer to the die.

Another process in which the present invention has application is in the spunbond operations. In these operations, the molten resin is delivered by the extruder through a spunbond die which forms long generally continuous fibers and differs from the meltblowing operations by the absence of attenuating air streams. The diameters of spunbond fibers are generally much larger than meltblown fibers.

The present invention also has application in the spray application of molten coatings and adhesives. In this process, molten polymer coating or adhesive is applied to a substrate by the use of air extrusion die which may include an air assembly. This process may be considered a meltblowing process since air is used to stretch and attenuate the polymer streams as they discharge from the die orifices.

These processes all involve the extrusion of a polymer melt through a die, but generally require different polymers or different polymer properties.

In all of these applications, there is a need for a simple, efficient system for delivering the polymer melt at controlled rates, pressures, and temperatures. The conventional delivery systems have involved the use of long extruder screws (L/D in the order of 30/1) with close tolerance. The close tolerance between the auger screw and the screw barrel shears the polymer and generates heat which assists in melting the polymer. In some applications, gear pumps are used in series with the extruder. The conventional polymer delivery systems are an arrangement of separate parts (e.g. extruder and gear pump) which are generally limited to the available designs and structures. Such systems do not represent fully integrated systems and therefore must be provided with separate controls, prime movers, heaters, etc.

SUMMARY OF THE INVENTION

The polymer delivery system of the present invention is an integrated system comprising a polymer resin hopper including means for preheating the resin in the hopper; a body having mounted therein an auger screw assembly and means for heating the body; a gear pump; and a prime mover for driving both the gear pump and the auger screw. The discharge passage of the gear pump extends through the heated body for delivering the polymer melt to the extrusion die. Thus, the auger screw and the gear pump are driven by the same prime mover and the resin passing therethrough is heated by the same heating elements.

In a preferred embodiment, the apparatus further includes a filter mounted in the discharge passage and a pressure activated bypass valve for returning the melt to the auger assembly.

Preferably, the auger screw is a relative short (L/D less than 15:1, low tolerance (high clearance) screw for delivering polymer melt to the gear pump. The high clearance (10% or greater) avoids excessive shearing of the polymer melt.

The method of the present invention comprises preheating a thermoplastic polymer resin to form a melt, passing the melt through a heated body to further heat the melt and delivering it to the gear pump, pumping the melt through the heated body and to an extrusion die, and extruding the melt to form an extruded or molded product or coating.

In a specific embodiment, the invention is applied for the delivery of a melt to a meltblowing die used to produce meltblown webs or to apply polymer coatings or adhesives to a substrate.

BRIEF DESCRIPTION OF THE DRAWINGS

FIG. 1 is a side elevation view showing the polymer delivery system of the present invention connected to a meltblown die, which is illustrated schematically.

FIG. 2 is an end view, with portions cut away, of the delivery system of FIG. 1 taken along the cutting plane 2—2 thereof.

DESCRIPTION OF THE PREFERRED EMBODIMENTS

Figure 3:
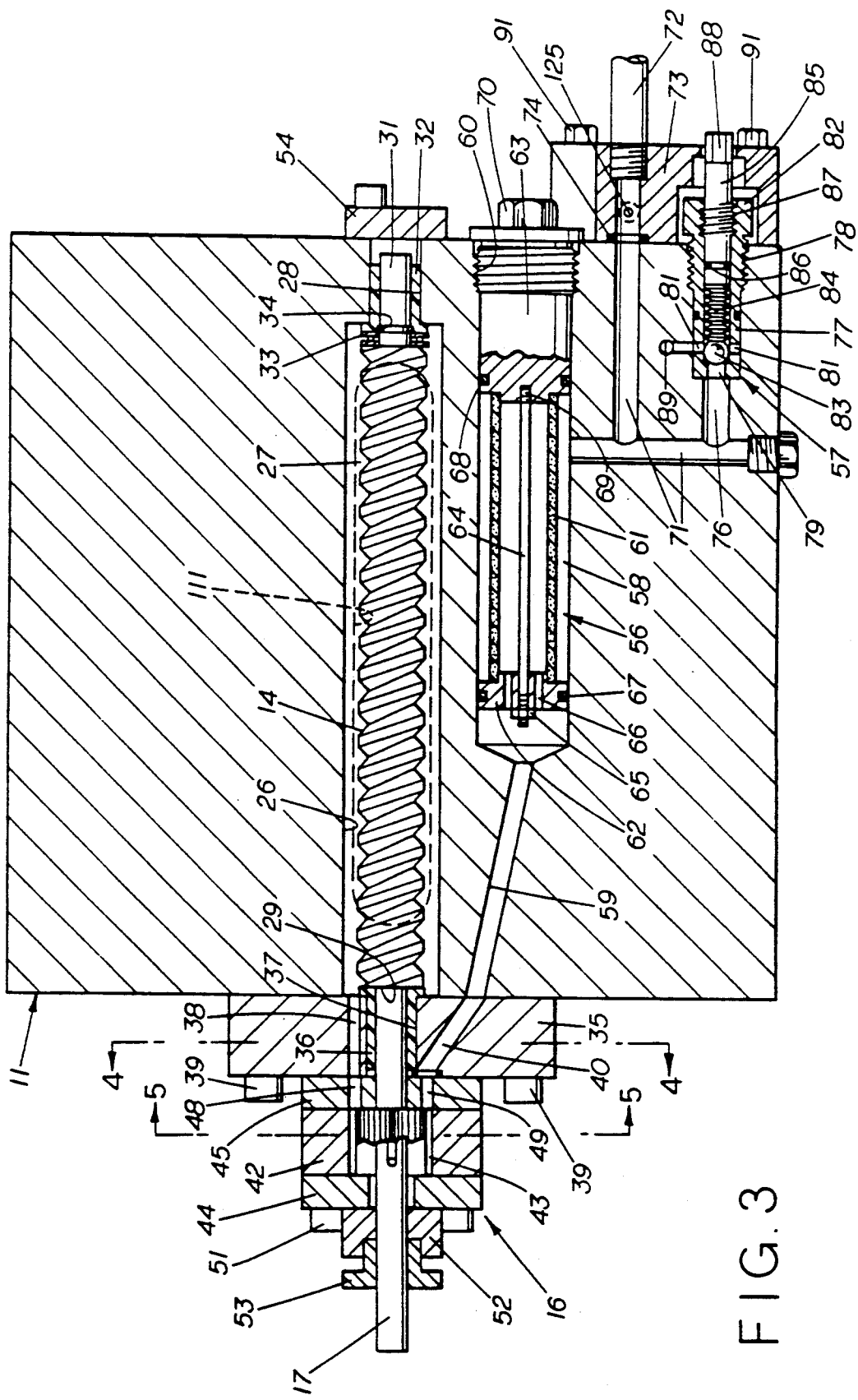
FIG. 3 is a horizontal sectional view of the delivery system of FIG. 1 taken along the cutting plane 3—3 thereof.

As illustrated schematically in FIG. 1, the polymer delivery system 10 of the present invention broadly comprises a heated body 11, a hopper 12 (with resin preheating means) positioned above the body 11, an auger screw 14 mounted on shaft 17 in body 11, a gear pump 16 mounted on shaft 17, and prime mover 18 for driving drive shaft 17. The prime mover 18 (e.g. electric motor) drives shaft 17 through gear box connection 19, shaft 21. and coupling 22.

Briefly, the operation is as follows: resin is preheated and melted in hopper 12 and is gravity fed to the auger screw 14 in the heated body 11. The screw 14 force feeds the melt to the gear pump 16 which pumps the melt through the heated body 11 and to the extrusion die 23. The pump pressure is sufficient to extrude the melt through the extrusion die.

Details of the delivery system will be described with reference to five principal parts: the auger screw assembly, the gear pump assembly, the filter assembly, the bypass assembly, and the hopper assembly. These parts are integrated into a portable unitary structure which is efficient in operation and is readily adapted to a variety of applications.

Figure 4:
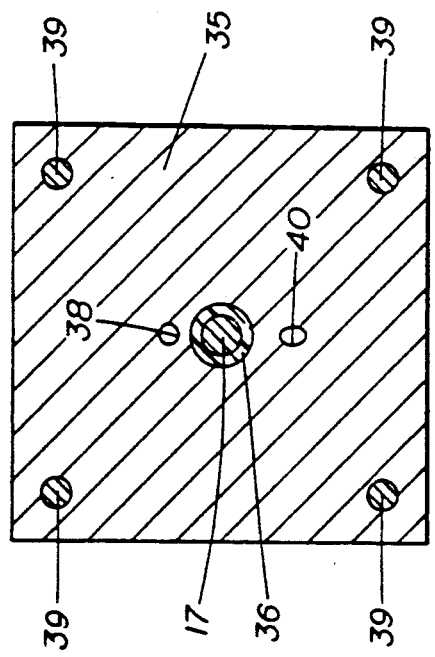
FIG. 4 is a sectional view of the pump adapter illustrated in FIG. 3, taken along the cutting plane 4—4 thereof.

The Auger Screw Assembly (FIGS. 3 and 4)

The body 11 is preferably made of a block of metal such as steel, steel alloys or aluminum which is drilled or bored to provide the cavities, chambers, and passages described herein. (The body 11 can also be made of heat conductive, high temperature engineering plastics.)

As shown in FIG. 3, the body 11 has a large diameter bore 26 drilled therein which defines auger chamber 27 (also referred to as auger barrel). A small diameter hole 28 extends coaxially from chamber 27 through the end of block 11. The chamber 27 and hole 28 receive the auger screw assembly which comprises auger screw 14 having one end integrally joined to shaft 17 as at 29 and its opposite end integrally joined to stub shaft 31. The screw 14 and shafts 17 and 31 may be machined from the same steel body.

The screw 14 fits within chamber 27 and stub shaft 31 is journaled within hole 28 by bearing 32. A thrust bearing 33 may be positioned between bearing 32 and screw 14. O-ring 34 mounted in a groove on shaft 31 maintains a fluid seal between the shaft 31 and bearing 32.

The auger screw 14 extends substantially the entire length of chamber 27. Shaft 17 extends axially outwardly from the screw 14, (with only a small portion, as at 29, being housed within chamber 27) and is keyed to the driven gear of gear pump 16.

The auger screw 14 is designed to convey polymer through chamber 27 (from right to left is left as viewed in FIG. 3.) upon rotation thereof to force feed the gear pump 16. The screw 14 may take a variety of shapes and forms. The screw 14 illustrated in FIG. 3 is a fluted screw wherein a spiral flute is separated by land portion. The flute tapers at 45° with respect to the screw axis and is provided with a pitch of 0.615 and 1.625 threads per inch. The screw barrel defined by bore 26 is sized to provide a relatively large clearance for the OD of the screw 14 to avoid shearing the resin melt. Clearance should be at least 10% and not more than 60%, preferably at least 15 to 55%, and most preferably 20 to 50%, which is calculated as follows:

% clearance = 100[(barrel diameter-OD of screw)/barrel diameter]

Adapter block 35 adapts the gear pump 16 to the auger assembly. The adapter block 35 is secured to body 11 by bolts 30 and covers the exposed end of chambers 27. Formed in adapter block 35 is a central opening 37 which is aligned with chamber 27. Shaft 17 extends through the opening 37 and is journaled to the adapter block 35 by bearing 36. A polymer flow passage 38 extends through the block 35 parallel to opening 37 and serves to conduct polymer from chamber 27 to the gear pump 16. Also formed in block 35 is an angular flow passage 40 for conducting polymer melt from the gear pump 16 to the body 11 as described below.

Figure 5:
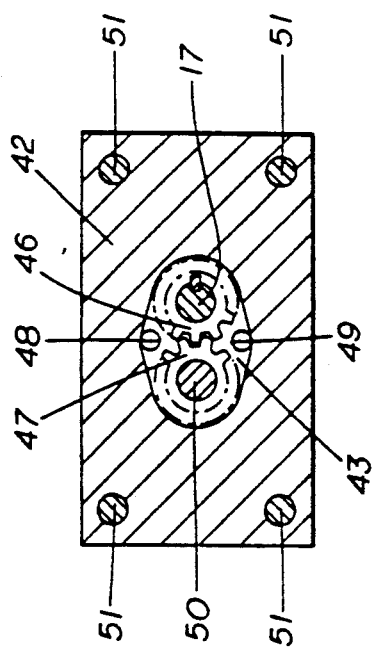
FIG. 5 is a sectional view of the gear pump illustrated in FIG. 3, taken along the cutting plane 5—5 thereof.

Gear Pump Assembly (FIGS. 3 and 5)

The gear pump 16 comprises housing 42 which defines pump chamber 43, end plates 44 and 45, and internal gears 46 and 47. Shaft 17 extends through the pump chamber 43 and has driven gear 46 keyed thereto. The idler gear 47 mounted on trunion 50 is positioned in meshing relationship with driven gear 46. End plate 45 is positioned between the housing 42 and the adapter block 35. A passage 48 formed in end plate 45 is aligned with passage 38 of the adapter plate 35 and serves to conduct polymer melt to pump chamber 43. Passage 49 formed in end plate 45 is aligned with the inlet passage 40 of the adapter block 35. The pump components 42, 44, and 45 are assembled in stacked relationship and bolted to adaptor block 35 by bolts 51. A stuffing box is provided by member 52 bolted to end plate 44 and member 53 secured to member 52 with packing provided therebetween. The auger assembly and the gear pump assembly may be preassembled as a unit for insertion into the bores 26 and 28 of body 11 and secured thereto by bolts 39. Bearing cap 54 bolted to body 11 closes the exposed end of bore 28.

Although gear pumps are preferred, any positive displacement rotary pump may be used. These pumps deliver a controlled output rate proportional to rotation.

Filter Assembly and Bypass Valve Assembly (FIGS. 2 and 3)

The polymer delivery system of the present invention preferably includes a filter assembly 56 and a bypass valve assembly 57 within body 11. The filter assembly 56 fits in a cavity 58 formed in body 11. Body passage 59 extends from the gear pump side of body 11 and conducts polymer from adapter passage 40 to cavity 58. The exposed inlet of the cavity 58 is provided with threads 60 which mesh with the threads of the filter assembly as described below.

The filter assembly 56 is a preassembled unit comprising a filter tube 61, end member 62, and threaded end member 63. The filter 61 is maintained in position by a rod 64 which is threaded to member 63 as at 69; and extends through the center of filter tube 61, through end member 62, and is held in place by nut 65. Ports 66 formed in end member 62 serve to conduct polymer melt to the interior of filter 61. 0-rings 67 and 68 positioned in suitable grooves formed in members 62 and 63 provide a fluid seal therebetween. The filter assembly 56 is insertable into the cavity 58 and screwed into body 11 by meshing threads as at 60. Exposed hexhead 70 formed in end member 63 facilitates removal and insertion of the filter assembly 56 for cleaning and filter replacement. The filter tube 61 may be made of any porous material of proper permeablility and useable at the operating temperature. Sintered metals are particularly suitable filter material. Sintered steel for example can be used at extremely high temperatures.

Flow passage 71 formed in body 11 extends outwardly from cavity 58 and has its inlet between end members 62 and 63. Passage 71 connects to output conduit 72 through adapter 73. Conduit 72 leads to extrusion die 23. O-ring 74 provides a fluid seal between adapter 73 and body 11.

Bypass passage 76, formed in body 11, leads to the bypass valve assembly 57. This assembly comprises a tubular cartridge 77 threaded to body 11 as at 78 and a ball and spring plunger assembly mounted in cartridge 77. Cartridge 77 has inlet port 79, outlet ports 81 and hexhead 82. The plunger assembly comprises ball 83, spring 84, and plunger 85. The plunger 85 fits snuggly within the cartridge 77, is provided with O-ring 86, and is threaded to the cartridge as at 87. The ball 83 normally closes port 79 by the spring force thereon. Hexhead 88 permits adjustment of the force exerted by spring 84 between the end of plunger 85 and ball 83. Rotation in one direction increases the spring force on the ball 83, and rotation in the opposite direction reduces spring force, thereby permitting control of the release pressure. The spring 84 may be in the form of stacked Belleville washers.

A return passage formed in body 11 (best seen in FIG. 2) extends from the outlet port 81 to the auger screw inlet 13 as described in more detail below. The adapter 73 has a recess formed therein for receiving the cartridge hexhead 82, and a opening for exposing the adjustment hex 88 of the plunger 85. The adapter 73 is secured to the body 11 by bolts 91.

It will be appreciated by those skilled in the art that the interfaces between confronting metal surfaces may be provided with gaskets or finished to provide metal to metal seals.

The Hopper Assembly (FIGS. 2, 3, 6, and 7)

The hopper 12 is secured to the top surface of body 11 and comprises base plate 95, front and back panels 96, and side panels 97. The panels 96, 97 and base plate 95 may be made of steel and welded together in the assembly shown in FIG. 6, wherein the panels 96 and 97 and base plate 95 define a resin reservoir 101. The base plate 95 should be somewhat sturdier and extend beyond the periphery of the square or rectangle defined by the bottom edges of the panels 96, 97. The base plate 95, with the panels 96, 97 secured thereto, is bolted to body 11 by bolts 98. A gasket 99 is provided between the hopper base plate 95 and body 11.

The base plate 95 has a slot 100 (best seen in FIG. 1) formed therein which extends from front to the back and is equidistant from side panels 97. Mounted in the hopper 12 and flanking slot 100 are heater and heat sink assemblies 102 and 103 which are essentially identical. Each assembly 102, 103 comprises a solid steel wedge 104, heater element 105 extending longitudinally therethrough, and heating fins 106 that extend upwardly within the reservoir 101 from the tapered wedge surface. The wedge 104 has formed therein a bore for receiving the retractable heater element 105. The wedge 104 is secured to panel 47 and to the base plate 95 by weldments. Each wedge 104 tapers downwardly toward slot 100 and in combination with the other wedge defines a funnel for feeding polymer into slot 100 (see FIG. 2). The taper should be sufficient to avoid dead space; tapers in the order of 20° to 40° (with horizontal) will be satisfactory for most applications.

Figure 7:
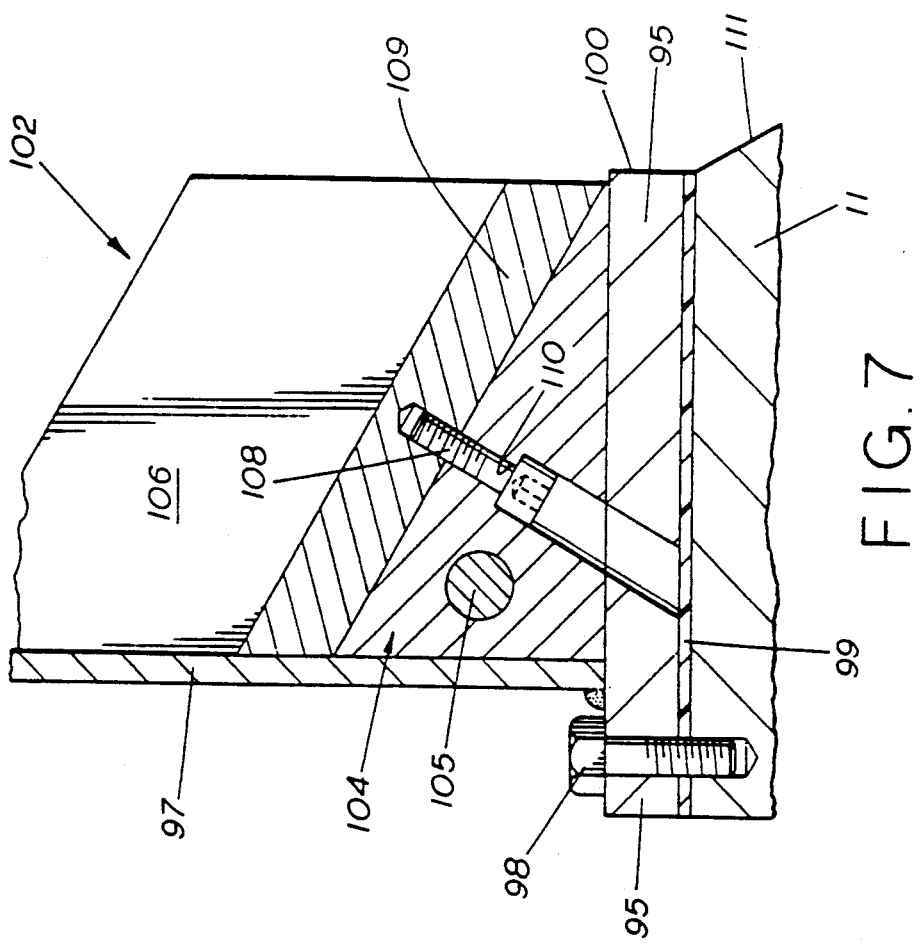
FIG. 7 is an enlarged sectional view of a portion of FIG. 2 illustrating the means for mounting the heater and fin assembly shown in FIG. 6 in the system hopper.

The fins 106 extend vertically, upwardly from the tapered surface of wedge 104 and are bolted thereto as illustrated in FIG. 7. Bolts 108 extend angularly upwardly through holes 110 in the wedge 104 and are threaded to the fin base 109.

Figure 6:
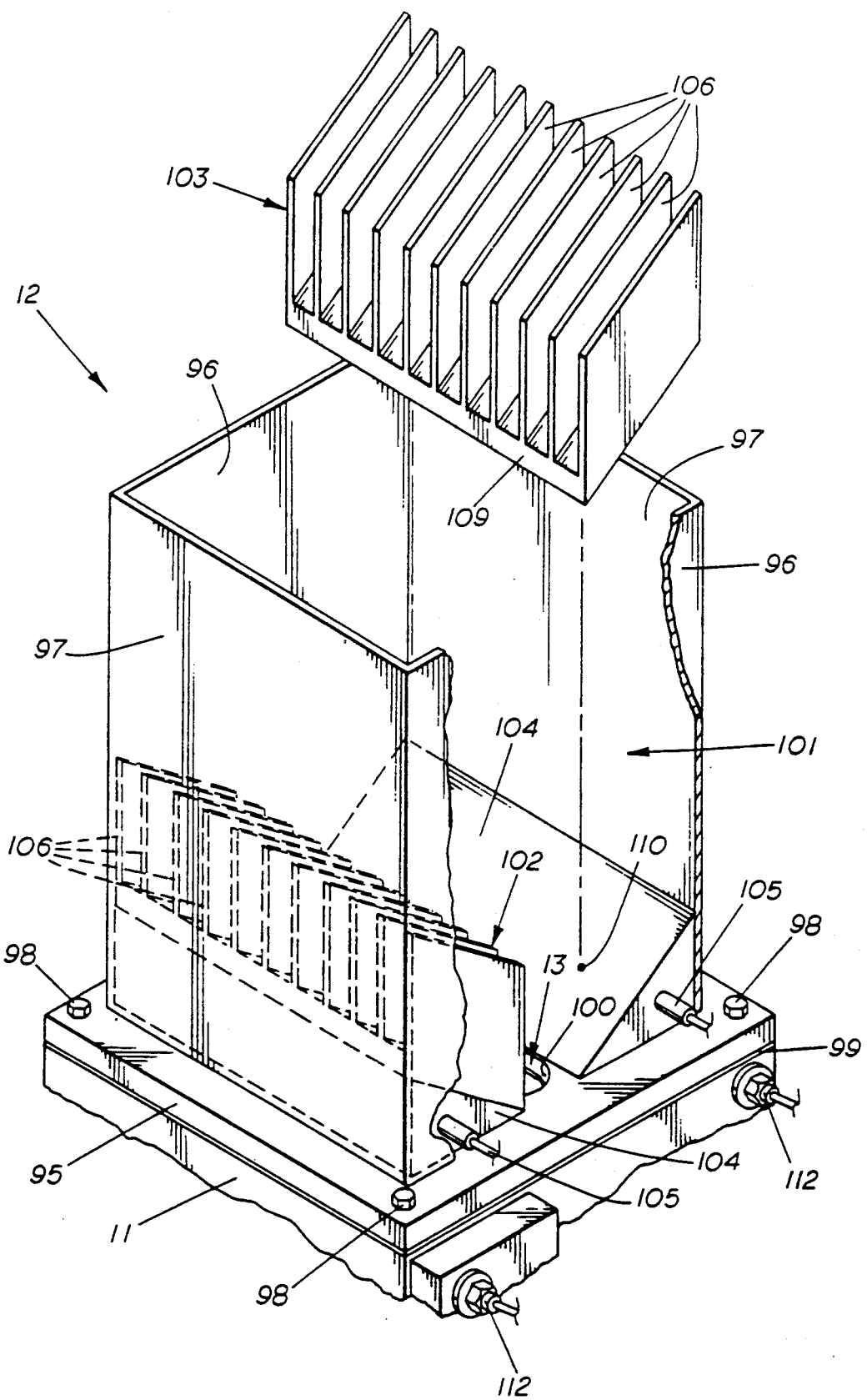
FIG. 6 is a perspective view, with portions cut away, illustrating the hopper construction of the delivery system.

As shown in FIG. 6, the fin structure, comprising base 109 and fins 106, are bolted to its associated wedge by two longitudinal locations indicated by holes 110. The fins 106 are made of any highly heat conductive material, preferably of extruded aluminum. Other useable heat conductive materials include copper, brass, and the like. The fins 106 are spaced longitudinally within 2 inches apart, preferably within 1½ inches apart, and most preferably within 1 inch apart. The fins 106 may traverse the full width of the reservoir 101 but, as illustrated, may also terminate in line with slot 100. The fins 106 extend upwardly from the wedge 104 within hopper for a distant of at least 1 to 6 inches and preferably 3 to 5 inches. The fins 106 preferably should be thin in the order of ⅛ to ¼ inch, and have a combined cross sectional area (measured along a horizontal plane) of not more than 20%, preferably not more than 15%, of the horizontal cross sectional area of the reservoir 101.

Each heater and heat sink assembly 102, 103 may be preassembled within the hopper 12 and the heater elements 105 inserted through appropriate holes formed in the front plate panel 96. The heater elements may be in the form of electric resistant electrodes and may be connected to a suitable power source by conductors 113.

In some embodiments, it may be desirable to insert electric conductors in the fins 106 to assist the heating of the resin.

Returning to FIG. 2, an upper portion of body 11 has an elongate, downwardly tapering slot 111 formed therein. Slot 111 aligns with slot 100 and feeds polymer from reservoir 101 to auger chamber 27. Bypass passage 89 discharges into slot 111 as shown in FIG. 2.

The body 11 is provided with heating elements 112 which also may be electric resistance electrodes connected to a suitable electric power source (e.g. 230 or 440 v., a.c. single or three phase).

Alternatively, the hopper 12 and body 11 may be heated with hot thermal oil circulated through passages formed generally at the location or the electrodes illustrated the drawings.

The heating means are positioned in body 11 to heat chamber 27 and passages 59, filter assembly 56 and bypass valve assembly 57. In the embodiment illustrated in FIG. 2, four elements 112 are provided.

An advantage of preheating the resin in reservoir 101, in addition to melting the resin, is the heat generated dries the resin particles in the upper region of the reservoir. This avoids particle tackiness which causes bridging and agglomeration.

Extrusion Die

The term extrusion die includes meltblowing dies, spunbond dies, film and sheet dies, spray nozzles, and openings for molds and the like. In other words, the polymer melt system 10 may be used in any operation that applies, forms, shapes, or molds thermoplastic polymer materials from a polymer melt.

Although the polymer delivery system of the present invention can be used in a variety of applications as noted above, it is illustrated in FIG. 1 in connection with meltblowing die 23. The meltblowing die 23 is a complex structure which is illustrated schematically in FIG. 1 as comprising a body 115, die tip 116, polymer flow passage 117, a plurality of side-by-side, orifices 118 formed in the die tip 116, and air knives 119. The air knives 119 in combination with the tapered die tip 116 define air passages 126. Hot air delivered to the die through passages 120 delivers sheets of air on either side of the polymer fibers extruded through orifices 118. The fibers 121 are attenuated and stretched by the air, forming microsized fibers, (1–15 microns) which are collected on a suitable drum or conveyor. The meltblowing die 23 may be constructed in accordance with U.S. Pat. Nos. 3,978,185 or 4,818,463, the disclosures of which are incorporated herein by reference.

When the meltblowing die is used to apply a coating or adhesive to a substrate, the die 23 may be designed to operate on the same principle, but a lower viscosity resin is generally employed. This may produce large diameter polymer streams 121 which are deposited not as a nonwoven fiber, but as a layer or strip of polymer on a substrate. The die openings, die tip, air knoves and operating temperatures and pressure will be adjusted to provide the desired results. The polymer useable in adhesives include EVA's (e.g. 20–40 wt % VA). These polymers generally have lower viscosities than those used in the production of meltblown webs. Conventional hot melt adhesives useable in the invention also include those disclosed in U.S. Pat. Nos. 4,497,941, 4,325,853, 4,650,829, and 4,315,842, the disclosure of which are incorporated herein by reference. Polymers used in coating applications may be the same as those used in meltblowing webs but at a somewhat lower viscosity grade.

One advantage of the meltblowing process is its ability to process a variety of polymers including polypropylene, polyethylene (low and high density) ethylene copolymers (e.g. EVA copolymers) nylon, polyamides, polyesters, polystyrene, poly-4-methylpentene-1, polymethylacrylate, polytrifluorochloethylene, polyurethanes, polycarbonates, silicones, pitch, and blends of the above. The MFR for meltblowing polymer is in the range of 300 to 1400 (at 230° C.). The polyolefin polymers, particularly polypropylene, are ideally suited for meltblowing because of available grades having low molecular weight, low viscosity, narrow molecular weight distribution, and excellent stability.

The entire assembly comprising prime mover 18, delivery system 10, and the die 23 may be mounted on a suitable base 122 and may be connected to a control assembly shown as 123 in FIG. 1. The base 122 is provided with castors 123 making the entire assembly portable. Temperature and pressure controls may be used to control the temperature of the hopper, the body, and rate of operation of screw and gear pump.

It will be appreciated however by those skilled in the art that the apparatus of the present invention may be used in connection with a spunbond system for delivering fibers in the size range typically of 10 to 100 microns. Resins for spunbond operations may be the same as those identified above but generally will have a lower MFR.

Operation

An important feature of the present invention is the coordinated operations between the screw auger assembly 14 and the gear pump 16. The auger is designed to deliver molten polymer at a pressure to positively feed the gear pump 16. It is preferred that the screw have a delivery capacity of at least 10% in excess of the output rate of the gear pump. The gear pump output and the auger output are proportional to the rate of rotation of shaft 17. Thus, increases in rpm of shaft 17 increases the output of both. They are sized to provide the coordinated action of the auger to force feed the gear pump at pressures of less than 500 psi and preferably less than 200 psi.

The heating elements within the hopper 12 are designed to generate resin temperature of up to 950° F. and preferably up to 700° F. The heat generated in the solid steel wedges in 104 is conducted to the fins 106 thereby preheating the resin and generating a resin melt at a level within hopper 12 equal at least to the height of the wedges 104. The molten resin is fed through slots 100 and 111 and enter auger chamber 27 where it is delivered through passages 38 to gear pump 16. The melt is pumped at a pressure in the range of 100 to 10,000 psi, generally 100 to 2,000 psi, through passages 40 and 59 and through filter assembly 56.

The actual pressure will depend on the application, with the following ranges being representative:

| | |
|---|---|
| meltblowing nonwoven webs | 500–1,000 psi |
| meltblowing coatings | |
| and adhesives (high temperatures) | 10–200 psi |
| (low temperatures) | 200–1,000 psi |
| spunbond | 500–2,000 psi |
| molding | 100–10,000 psi |

The gear pump is sized to deliver output rate of between 0 and 2500 pounds per hour, preferably between 100 and 2500 pounds per hour. The melt flows through passages 66 to the interior of filter 61 radially outwardly through the filter 61, through passage 71 and finally to the die 23 via tube 72. If the pressure exceeds the controlled delivery pressure, the bypass valve 57 is actuated thereby relieving the pressure through passage 76, ports 79, 81, and passage 89, returning the melt to auger feed slot 111. An alternate mode of operation is to use valve 57 as a pressure control valve whereby polymer is constantly circulated therethrough at a control pressure.

Important features of the present invention are (a) the preheating of the resin within the hopper by the apparatus described herein, (b) the high clearance auger screw which avoids resin shears, (c) the coordinated action of the auger 14 and the gear pump 16 which are driven by the same shaft 17 (This means that only one prime mover is needed for the assembly), (d) the filter assembly, and (e) the bypass assembly.

An optical feature of the present invention is to include a temperature probe and/or pressure transducer 125 which can be installed in passage 71 as illustrated in FIG. 3

What is claimed is:

1. A system for delivering a polymer melt to an extrusion die which comprises:
   (a) a body having an auger chamber and chamber inlet and outlet passages formed therein;
   (b) a resin hopper mounted on the body for feeding resin to the auger chamber inlet passage;
   (c) means for preheating the resin which includes (i) a heat conductive base mounted in the bottom of the hopper, and (ii) a plurality of heat conductive fins extending upwardly from the base for conducting heat therefrom;
   (d) means for heating the body and the base whereby heat is conducted to the fins to melt resin therebetween whereby the resin enters the chamber inlet as a melt;
   (e) an auger screw mounted in the auger chamber, said auger screw clearance in the chamber being at least 10%;
   (f) a positive displacement rotary pump connected to said body and adapted to receive polymer melt from the chamber outlet passage;
   (g) a pump discharge passage formed in the body for conducting pressurized polymer melt from the pump, said means for heating the body being adapted to heat the body at least in areas surrounding the auger chamber and the pump discharge passage to deliver heat to polymer melt conducted therein;

(h) conduit means interconnecting the pump discharge passage and the extrusion die; and (i) a drive shaft connected to drive said rotary pump and to drive said auger screw, wherein rotation of the shaft drives the auger screw and the rotary pump in timed relation to cause the melt to flow from the hopper through the auger chamber, through the rotary pump, and through the pump discharge passage to the extrusion die.

2. The system as defined in claim 1 wherein the pump discharge passage includes a filter positioned therein.

3. The system as defined in claim 1 wherein the discharge passage further includes a pressure bypass valve and a bypass passage extending from said bypass value to the inlet of said auger chamber.

4. The system of claim 1 wherein the auger screw and the rotary pump are driven by said shaft at the same r.p.m.

5. The system of claim 4 wherein the rotary pump is a gear pump.

6. The system as defined in claim 5 wherein the auger screw is sized to provide a positive feed pressure to said gear pump.

7. A system for delivering a polymer melt to an extrusion die which comprises:

(a) a body having an auger chamber and chamber inlet and outlet passages formed therein;

(b) a resin hopper mounted on the body for feeding resin to the auger chamber inlet passage;

(c) means for preheating the resin which includes (i) a block mounted in the bottom of the hopper on opposite sides of the chamber inlet passage, and (ii) a plurality of heat conductive fins extending upwardly from each block for conducting heat therefrom;

(d) means for heating the body and each block whereby heat is conducted to the fins to melt resin therebetween, said resin entering the chamber inlet passage as a melt;

(e) an auger screw mounted in the auger chamber, said auger screw clearance in the chamber being at least 10%;

(f) a positive displacement rotary pump connected to said body and adapted to receive polymer melt from the chamber outlet passage;

(g) a pump discharge passage formed in the body for conducting pressurized polymer melt from the pump, said means for heating the body being adapted to heat the body at least in areas surrounding the auger chamber and the pump discharge passage to deliver heat to polymer melt conducted therein;

(h) a pressure activated bypass valve mounted in said pump discharge passage and a bypass passage extending from the bypass valve to the chamber inlet passage;

(i) conduit means interconnecting the pump discharge passage and the extrusion die; and (j) a drive shaft connected to drive said rotary pump and to drive said auger screw, wherein rotation of the shaft drives the auger screw and the rotary pump in timed relation to cause the melt to flow from the hopper through the auger chamber, through the rotary pump, and through the pump discharge passage to the extrusion die.

8. The system of claim 7 wherein the blocks are made of steel wedges which taper from the hopper edges inwardly and downwardly toward said slot.

9. The system of claim 8 wherein the fins are made of aluminum and are parallel to one another and are disposed at right angles to the longitudinal axis of said slot.

10. The system of claim 9 wherein the fins extend vertically upwardly from the tapered surface of the wedges.

11. The system as defined in claim 10 wherein the fins extend upwardly from each block and are separated within 2 inches apart.

12. A system for delivering a polymer melt to an extrusion die which comprises:

(a) a body having an auger chamber and chamber inlet and outlet passages formed therein;

(b) a resin hopper mounted on the body for feeding resin to the auger chamber inlet passage;

(c) a plurality of laterally spaced heat conductive members mounted in the lower portion of the hopper to receive resin therebetween;

(d) means for heating the body and the heat conductive members whereby heat is conducted to the members to melt resin therebetween, said resin entering the chamber inlet passage as a melt;

(e) an auger screw mounted in the auger chamber, said auger screw clearance in the chamber being at least 10%;

(f) a positive displacement rotary pump connected to said body and adapted to receive polymer melt from the chamber outlet passage;

(g) a pump discharge passage formed in the body for conducting pressurized polymer melt from the pump, said means for heating the body being adapted to heat the body at least in areas surrounding the auger chamber and the pump discharge passage to deliver heat to polymer melt conducted therein;

(h) conduit means interconnecting the pump discharge passage and the extrusion die; and (i) a drive shaft connected to drive said rotary pump and to drive said auger screw, wherein rotation of the shaft drives the auger screw and the rotary pump in timed relation to cause the melt to flow from the hopper through the auger chamber, through the rotary pump, and through the pump discharge passage to the extrusion die.

* * * * *